United States Patent [19]
Ostrander

[11] 3,750,464
[45] Aug. 7, 1973

[54] DYNAMOMETER APPARATUS FOR CLEATED VEHICLES

[75] Inventor: Robert F. Ostrander, Orange, Conn.

[73] Assignee: Ostradyne, Inc., Milford, Conn.

[22] Filed: Jan. 29, 1971

[21] Appl. No.: 111,059

[52] U.S. Cl. ................................................ 73/117
[51] Int. Cl. ............................................. G01l 5/13
[58] Field of Search ..................... 73/117, 123, 124, 73/125, 126, 146; 198/193; 74/231; 161/160

[56] References Cited
UNITED STATES PATENTS

| | | | |
|---|---|---|---|
| 3,520,180 | 7/1970 | Polhemus et al. ............... | 73/146 X |
| 1,870,716 | 8/1932 | Domzalski .......................... | 73/117 |
| 3,345,865 | 10/1967 | Ostrander .......................... | 73/116 |
| 3,277,702 | 10/1966 | Brenneke .......................... | 73/117 |
| 450,999 | 4/1891 | Dodge .............................. | 74/231 C |
| 2,696,104 | 12/1954 | Markey et al. ..................... | 73/117 X |
| 3,585,855 | 6/1971 | Albertson .......................... | 73/117 |
| 3,621,727 | 11/1971 | Cicognani ......................... | 74/231 C |

FOREIGN PATENTS OR APPLICATIONS

| | | | |
|---|---|---|---|
| 231,871 | 11/1968 | U.S.S.R. ........................... | 73/117 |
| 346,079 | 11/1919 | Germany .......................... | 73/123 |

*Primary Examiner*—Jerry W. Myracle
*Attorney*—Delio & Montgomery

[57] ABSTRACT

Chassis dynamometer apparatus for cleated, track driven vehicles having an endless belt for frictional contact with the cleats, wherein the belt is a V-belt or a cog belt having a surface layer of a resilient material capable of embedding the cleats of such vehicles without substantial slippage and destruction of the belt.

7 Claims, 4 Drawing Figures

PATENTED AUG 7 1973 3,750,464
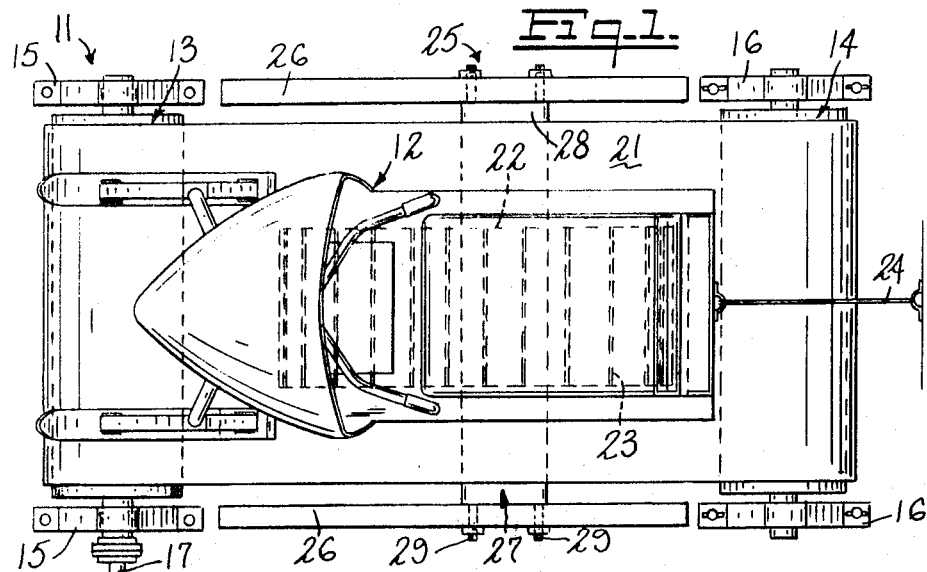
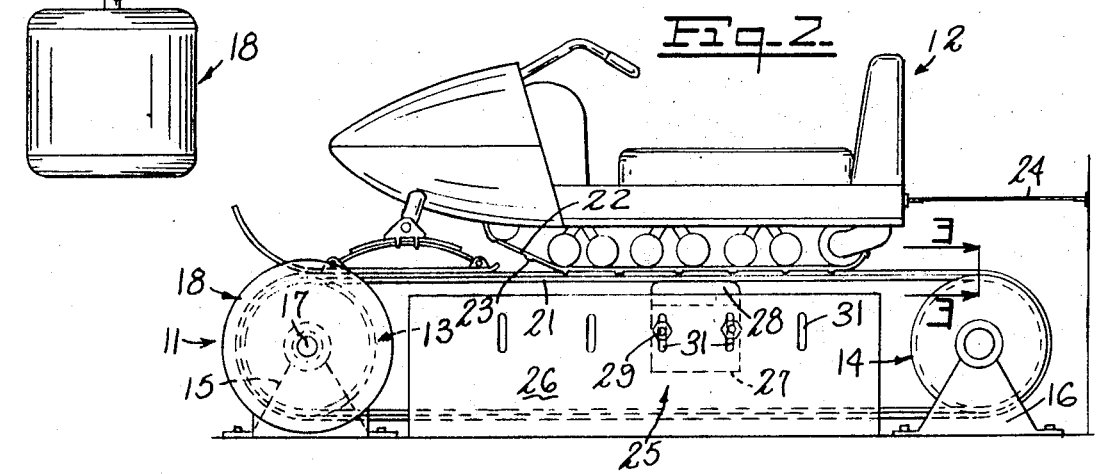
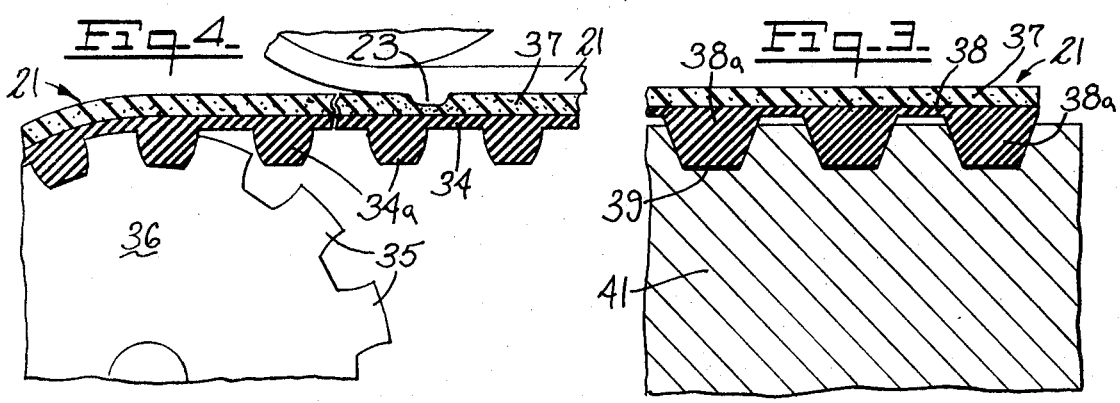
INVENTOR
Robert F. Ostrander
BY Dedeo and Montgomery
ATTORNEYS

DYNAMOMETER APPARATUS FOR CLEATED VEHICLES

BACKGROUND OF THE INVENTION

This invention relates to chassis dynamometers for testing the power output, braking effectiveness and other factors of performance of track driven vehicles in which the tracks are cleated, or endless belt driven vehicles, and in particular to dynamometer apparatus for snowmobiles.

Dynamometers for cleated vehicles such as snowmobiles and the like are a recent development in the art. As a result today, there are a paucity of such dynamometers available for the testing of snowmobiles. One type of dynamometer available for snowmobile testing consists of a series of small nomadic tiered wheels closely spaced together, which wheels engage a snowmobile drive belt. These wheels are interconnected to one another and in turn are connected to a common shaft which is finally connected to a dynamometer (power absorber). Due to the variety of snowmobile drive belts and due to the difference in the configurations of such belts, such pneumatic tiered wheel dynamometers have proved to be deficient in their operation. As such, speed and power measurements have been inconsistent and sporadic. In addition, these pneumatic tiered wheel dynamometers have a tendency to develop in many instances excessive noise and distortion which produces fatigue in the snowmobile drive chain and suspension system.

In other dynamometer testing devices the dynamometer apparatus for cleated vehicles has proved to be fragile and subject to rapid destruction and deterioration for the dynamometer test apparatus.

OBJECTS AND SUMMARY

Accordingly, an object of the invention is to provide a new and improved chassis dynamometer apparatus for cleated vehicles for reliably testing and measuring snowmobile operation.

Another object is to provide a new and improved chassis dynamometer apparatus for cleated vehicles in which the apparatus is not subject to the rapid destruction and noise levels normally encountered in such devices.

Still another object of the invention is to provide a new and improved method for accurately determining the power transmission characteristics of cleated vehicles.

Still other objects, features and advantages of the invention will in part be obvious and will in part be apparent from the specification which follows.

Briefly, the chassis dynamometer apparatus of the invention includes the combination of a head pulley, a tail pulley, dynamometer testing means operatively connected to one of the pulleys, and an endless belt engaging the pulleys, wherein the belt has a foundation layer for operative contact with the pulleys and a surface layer comprising a resilient material capable of embedding the cleats of the vehicle without slippage between the cleated track and the belt. By this means, more positive traction between the belt and the cleated track is provided together with reduction of parasitic power losses and operating noise, resulting in longer life for the belt, more accurate test results, and higher speed of belt and cleated track.

The invention accordingly comprises the features of construction, combinations of elements and arrangement of parts, and the several steps in relation of one or more of such steps with respect to each of the others, all as exemplified in the following detailed description, and the scope of the invention will be indicated in the claims.

DETAILED DESCRIPTION

For a fuller understanding of the nature and objects of the invention, reference is had to the following description taken in connection with the accompanying drawing, in which:

FIG. 1 is a top plan view of a snowmobile, representative of a cleated, track driven vehicle, mounted on dynamometer apparatus of the invention;

FIG. 2 is a side elevation of the combination of snowmobile and dynamometer apparatus of FIG. 1;

FIG. 3 is an enlarged vertical section along the line 3—3 of FIG. 2; and

FIG. 4 is an enlarged vertical section of another embodiment of the invention, similar to FIG. 3 but in a plane longitudinal of the view of FIG. 2.

With reference to the drawing, chassis dynamometer apparatus 11 of the invention, upon which is mounted a cleated track-driven vehicle such as snowmobile 12, includes a head pulley such as drive pulley 13, a tail pulley such as idler pulley 14, a pair of supports 15 for the head pulley and a pair of supports 16 for the tail pulley, and a drive shaft 17 to which is coupled a dynamometer unit 18 which may be any of the known power transmission testing devices, such as disclosed in U.S. Pat. No. 3,345,865. Mounted on pulleys 13 and 14 and in frictional engagement therewith is an endless belt 21. Belt 21 is arranged for horizontal, longitudinal contact with a cleated track 22 of snowmobile 12, such that the major portion of the weight of the snowmobile is cradled on the belt 21 between pulleys 13 and 14 with the cleats 23 of the snowmobile track in contact with the belt 21. A shackle 24, which may be modified to include a draw bar pull measuring device in a known manner, is connected to snowmobile 12 in any convenient position for restraining or measuring draw bar pull of the snowmobile.

The dynamometer apparatus 11 preferably includes lifting apparatus 25 posiitioned underneath track 22 having as components vertical supports such as steel plates 26, a support member such as steel plate 27 having a low friction surface member such as a plastic block 28. The plate 27 is preferably U-shaped and is fixed in any desirable position longitudinally of the dynamometer apparatus by bolts 29 in slots 31. It will also be noted that the slots 31 permit adjustment of the height of plate 27 relative to the underside of belt 21 and track 22.

While lifting apparatus 25 is shown as a separate unit from the other components of the dynamometer apparatus, it will be appreciated that various other forms are possible and practical, such as a rectangular frame which incorporates supports 15 and 16 as well as vertical supporting members or plates 26, the essential function of the lifting apparatus being to simulate upward forces on the track 22 such as the undulations normally encountered in the use of a snowmobile. The lifting apparatus 25 therefore cooperates with the other components of the dynamometer apparatus 11 to simulate use conditions of such cleated track driven vehicles and provides more accurate measurement of power transmission effects on the track and chassis of the vehicle.

Endless belt 21, in the embodiment of FIG. 4, is a cog belt in form wherein the foundation layer 34 has integral therewith cogs 34a for mating engagement with cogs 35 of cog pulley 36. Such cogged foundation layers are known and available in the trade as "cog belts." Superimposed and bonded to foundation layer 34 of belt 21 is a surface layer 37 comprising a resilient material which is capable of embedding the cleats 23 without substantial slippage between the cleats and the endless belt 21.

The surface layer 37 accordingly may comprise any natural or synthetic material which has sufficient tensile strength to resist destruction when repeatedly contacted with the cleats of the vehicle and which can be tightly bonded to the foundation layer of the belt. Such materials include both natural and synthetic rubber, as well as elastomeric materials not normally designated "rubber." Among the class of synthetic rubbers are included styrenebutadiene copolymers, polychloroprene, butyl rubbers, nitrile rubbers such as butadiene-acrylonitrile copolymers, polyisoprene, ethylene-propylene copolymers, diene-modified ethylene propylene copylmers (EPDM), and the like. The non-"rubber" elastomeric materials include the synthetic thermoplastic polymers and copolymers which either are resilient per se or which are internally or externally plasticized, or foamed, in order to provide the required resiliency. Such materials include ABS copolymers and certain polyamides, vinyl chloride polymers, polypropylene, and thermoplastic polyurethanes. The degree of resiliency may be provided in such materials in a known manner.

The thickness and degree of resilience of surface layer 37 may be varied to provide the proper balance between control of slippage and resistance to destruction of the layer, since the thicker and the more resilient the layer, the greater will be its susceptibility to destruction by shearing forces. About one-half to three-quarters inch thickness has been found suitable for most uses.

While it is possible that the belt 21 may be fabricated to provide a gradation of rigidity and resiliency from the region of engagement with the pulleys to the region of engagement with the cleats of the track driven vehicle being tested, it is generally more economical and practical to employ separate layers and to bond a resilient layer 37 to a foundation layer 34, as by vulcanization or by use of a suitable adhesive. It should be understood that materials for each of the foundation layer 34 and surface layer 37 are commercially available, and that foundation layers as a cog belt 34 are available as such, the invention being in the combination of these layer materials in conjunction with the other elements of the dynamometer apparatus. Any suitable technique may be used to vulcanize or adhere the two layers, such techniques being so well known that further discussion is unnecessary.

In an alternative, less preferred, embodiment of the endless belts 21, there may be used a series of V-belts, or a single belt having multiple V's, as illustrated in FIGS. 2 and 3 by a foundation layer 38 having V's 38a for mating with grooves 39 in a V-pulley 41. While less expensive, the V-belt configuration of FIG. 3 is less preferred than the cog belt configuration of FIG. 4 because the cog belt arrangement provides more positive control and measurement of power transmission characteristics.

If desired, resilient surface layer 37 may itself be corrugated, cogged, or given any other configuration for maximization of control of contact with the cleats of the test vehicle. For most purposes, however, a uniplanar surface is sufficient.

In operation, a cleated track-driven vehicle such as a snowmobile 12 is mounted on the endless belt 21 so as to be cradled between pulleys 13 and 14. The dynamometer measuring device 18 may then be driven so as to measure the power absorbing characteristics of the track of the snowmobile in contact with endless belt 21. Alternatively, the track 22 of the snowmobile may be driven and the power transmission characteristics such as torque measured by dynamometer testing device 18. At the same time, a draw bar pull measuring device may be connected to or associated with shackle 24 to record parasitic power losses for correlation with other measurements provided by the dynamometer apparatus, in a known manner. When in motion, the cleats 23 of the snowmobile embed in the resilient surface layer 37 to provide positive and relatively silent contract therewith. Aspects of the measurement of torque and other power transmission characteristics are well known in the art and therefore need not be described here.

Considerable variation is permissible in the arrangement of parts and materials described above. For example, the operation and function of lifting apparatus 25 may be accomplished by hydraulic, mechanical or electrical means, and adjustment of the pulleys may be provided for more or less tension of the belt 21, so as to simulate tracking conditions and forces. Moreover, multiple pulleys or rolls may be provided in addition to the head and tail pulleys, and certain of the pulleys or rolls may be raised or lowered, in the manner described in U.S. Pat No. 3,345,865, for variation and control of test conditions.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. What is claimed is:

1. In a chassis dynamometer apparatus for a cleated vehicle the combination of:
    a head pulley,
    a tail pulley,
    dynamometer testing means operatively connected to one of said pulleys, and
    an endless belt engaging said pulleys,
    wherein said belt has a foundation layer for operative contact with said pulleys, and a surface layer bonded to said foundation layer,
    said surface layer comprising a resilient, foam-like, thermoplastic material capable of embedding the cleats of said vehicle without substantial slippage therewith.

2. Apparatus according to claim 1 including means positioned between said pulleys for elevating said endless belt.

3. Apparatus according to claim 1 wherein said endless belt is a V-belt and said pulleys are grooved for mating therewith.

4. Apparatus according to claim 1 wherein said endless belt is a cog belt and said pulleys are also cogged for mating therewith.

5. Apparatus according to claim 1 wherein the foundation and surface layers of said belt are vulcanized together.

6. Apparatus according to claim 1 wherein the foundation and surface layers of said belt are bonded together with an adhesive.

7. Apparatus according to claim 1 wherein said surface layer comprises synthetic rubber.

* * * * *

PO-1050
(5/69)

UNITED STATES PATENT OFFICE
CERTIFICATE OF CORRECTION

Patent No. 3,750,464      Dated August 7, 1973

Inventor(s) Robert F. Ostrander

It is certified that error appears in the above-identified patent and that said Letters Patent are hereby corrected as shown below:

In the Abstract, line 4, after "resilient" insert --, foam-like, thermoplastic--.
Column 4, line 23, delete "contract" and substitute therefor --contact--.

Signed and sealed this 25th day of December 1973.

(SEAL)
Attest:

EDWARD M. FLETCHER, JR.      RENE D. TEGTMEYER
Attesting Officer      Acting Commissioner of Patents